US009713173B2

(12) United States Patent
Yu et al.

(10) Patent No.: US 9,713,173 B2
(45) Date of Patent: Jul. 18, 2017

(54) METHOD FOR IMPLEMENTING TRUNKING SERVICE, EVOLVED NODE B AND TERMINAL

(71) Applicant: ZTE CORPORATION, Shenzhen, Guangdong Province (CN)

(72) Inventors: Xi Yu, Shenzhen (CN); Liangbin Li, Shenzhen (CN); Zhiqiang Huang, Shenzhen (CN); Zhongshi Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/439,404

(22) PCT Filed: Aug. 2, 2013

(86) PCT No.: PCT/CN2013/080736
§ 371 (c)(1),
(2) Date: Apr. 29, 2015

(87) PCT Pub. No.: WO2014/067306
PCT Pub. Date: May 8, 2014

(65) Prior Publication Data
US 2015/0312944 A1 Oct. 29, 2015

(30) Foreign Application Priority Data

Oct. 31, 2012 (CN) .......................... 2012 1 0428084

(51) Int. Cl.
H04W 76/00 (2009.01)
H04W 76/02 (2009.01)
(Continued)

(52) U.S. Cl.
CPC ......... *H04W 76/002* (2013.01); *H04W 28/06* (2013.01); *H04W 76/02* (2013.01); *H04W 84/08* (2013.01)

(58) Field of Classification Search
CPC ..................................................... H04W 76/00
See application file for complete search history.

(56) References Cited

U.S. PATENT DOCUMENTS

| 9,332,569 B2* | 5/2016 | Rudolph | ............... H04W 72/14 |
| 2015/0312944 A1* | 10/2015 | Yu | .......................... H04W 76/02 370/327 |
| 2015/0365157 A1* | 12/2015 | Yang | ...................... H04B 7/024 370/329 |

FOREIGN PATENT DOCUMENTS

| CN | 101772197 A | 7/2010 |
| CN | 102083013 A | 6/2011 |

(Continued)

OTHER PUBLICATIONS

Liaison Statement: Potential Implementation of TETRA service over LTE; TC TETRA WG4; 3GPP SA1-Ad Hoc GCSE_LTE; Oct. 29, 2012.

*Primary Examiner* — Huy D Vu
*Assistant Examiner* — Teisha D Hall
(74) *Attorney, Agent, or Firm* — Ling Wu; Stephen Yang; Ling and Yang Intellectual Property

(57) ABSTRACT

A method for implementing a trunking service, an evolved node B and a terminal are applied to a long term evolution system, and the method comprises: an evolved node B receiving a call request message sent by a calling terminal in a trunking common control channel (TCCCH) in an uplink direction, wherein the TCCCH is used for bearing an uplink message of a trunking terminal. The above-mentioned technical solution implements a trunking function in a manner of newly adding a trunking service dedicated logic channel in (Continued)

an uplink/downlink direction and on the basis of an LTE system standard protocol, and supports concurrence of an LTE service and a trunking service in a same system. The demands of the trunking communications may be implemented on the basis of the LTE system, and the coexistence of the trunking service and the LTE service in a same system is implemented.

16 Claims, 2 Drawing Sheets

(51) Int. Cl.
*H04W 28/06* (2009.01)
*H04W 84/08* (2009.01)

(56) References Cited

FOREIGN PATENT DOCUMENTS

| | | |
|---|---|---|
| CN | 102215458 A | 10/2011 |
| CN | 102547585 A | 7/2012 |
| EP | 2066135 A1 | 6/2009 |
| JP | 2011523237 A | 8/2011 |
| WO | 2011137576 A1 | 11/2011 |

\* cited by examiner

US 9,713,173 B2

METHOD FOR IMPLEMENTING TRUNKING SERVICE, EVOLVED NODE B AND TERMINAL

TECHNICAL FIELD

The present document relates to the long term evolution (LTE) system, and in particular, to a method for implementing a trunking service, an evolved node B and a terminal.

BACKGROUND

The LTE is a 3GPP long term evolution project and is the biggest new technology research and development project initiated by the 3GPP in recent years, and such technology taking the OFDM/FDMA as the core can be regarded as "quasi 4G" technology. The main advantage of the LTE is that the peak rate is high, the system delay is small, and it supports the flexible configuration of the bandwidth. For example: the 20 MHz spectral bandwidth can provide the peak rate of downlink 100 Mbps and uplink 50 Mbps, the unidirectional transmission delay within the user plane is smaller than 5 ms, it supports the flexible configuration of 1.25 MHz to 20 MHz bandwidth and can also use the carrier polymerization technology to further improve the capacity of the cell. The LTE has the extensive application prospect.

While based on the trunking technology of the LTE, various particular services can be customized according to the demands. It is a broad market waiting for thorough excavation to realize various functions, such as hundreds responses to a single call and the video surveillance, etc. How to realize the smooth transition from the trunking service to the LTE is a topic worthy of research for ever.

SUMMARY

The technical problem that the embodiment of the present document requires to solve is to provide a method for implementing a trunking service, an evolved node B and a terminal, and the trunking service can be implemented in the LTE system and concurrent with the LTE service.

In order to solve the above-mentioned technical problem, the following technical solutions are adopted.

A method for implementing a trunking service, applied to a long term evolution system, comprises:

an evolved node B receiving, in a trunking common control channel (TCCCH) in an uplink direction, a call request message sent by a calling terminal, wherein, the TCCCH is used for bearing an uplink message of a trunking terminal.

Alternatively, the method further comprises:

the evolved node B, after receiving the call request message, judging whether the call request message is a trunking call request message according to reserved bits in a media access control (MAC) header of a data packet encapsulating the call request message; and if yes, then triggering the call to a scheduling platform (PDS).

A method for implementing a trunking service, applied to a long term evolution system, comprises:

an evolved node B, after receiving a trunking call request message, issuing a trunking paging message to a listening terminal in a trunking group of a calling terminal on a trunking paging control channel (TPCCH) on a downlink direction, wherein, the TPCCH is used for bearing the trunking paging message.

Alternatively, a reserved bit in a media access control (MAC) header of a data packet encapsulated by a message born by the TPCCH indicates that the message is a trunking service message.

Alternatively, the method further comprises:

when the evolved node B issues the trunking paging message to the listening terminal in the trunking group of the calling terminal on the TPCCH, carrying a trunking radio network temporary identity (T-RNTI) in the trunking paging message.

Alternatively, the method further comprises:

the evolved node B receiving a paging response message of the listening terminal on the trunking common control channel (TCCCH), and judging to page to a corresponding listening terminal after receiving the paging response message, wherein, the TCCCH is used for bearing an uplink message of the trunking terminal.

A method for implementing a trunking service, applied to a long term evolution system, comprises:

an evolved node B paging a listening terminal, and establishing a trunking group traffic channel (TGTCH) and a trunking group control channel TGCCH on a downlink direction in a cell to which the paged listening terminal belongs, wherein, the TGTCH is used for bearing downlink service data of the trunking service, and the TGCCH is used for bearing a downlink control message of the trunking service.

Alternatively, a reserved bit indication message in a media access control (MAC) header of a data packet encapsulated by messages born by the TGTCH and the TGCCH is a trunking service message.

Alternatively, the method further comprises:

after the evolved node B establishing the TGTCH and the TGCCH, sending channel resource information of the TGTCH to the listening terminal through the TGCCH, and triggering the listening terminal to monitor the TGTCH channel.

A method for implementing a trunking service, applied to a long term evolution system, comprises:

an evolved node B establishing an uplink and downlink dedicated service channel and an uplink and downlink dedicated control channel with a calling terminal, wherein, the uplink and downlink dedicated service channel bears uplink and downlink service data on the calling terminal, and the uplink and downlink dedicated control channel bears a control message between the calling terminal and an evolved node B.

Alternatively, a reserved bit in a media access control (MAC) header of a data packet encapsulated by a message born by the uplink and downlink dedicated service channel and the uplink and downlink dedicated control channel indicates that the message is a trunking service message.

A method for implementing a trunking service, applied to a long term evolution system, comprises:

a trunking terminal sending a call request message to an evolved node B on a trunking common control channel (TCCCH) at an uplink direction, wherein, the TCCCH is used for bearing an uplink message of a trunking terminal.

Alternatively, the method further comprises:

when the trunking terminal encapsulates the call request message, setting reserved bits in a media access control (MAC) header of a data packet encapsulating the call request message to indicate the call request message as a trunking call request message.

Alternatively, the method further comprises:

the trunking terminal sending trunking data to a scheduling platform (PDS) through establishing an uplink and downlink dedicated service channel with the evolved node B, wherein, the uplink and downlink dedicated service channel bears uplink and downlink service data on the calling terminal.

A method for implementing a trunking service, applied to a long term evolution system, comprises:

a trunking terminal establishing a trunking group traffic channel (TGTCH) and a trunking group control channel (TGCCH) on a downlink direction with an evolved node B after receiving a trunking paging message sent by the evolved node B, wherein, the TGTCH is used for bearing downlink service data of the trunking service, and the TGCCH is used for bearing a downlink control message of the trunking service.

Alternatively, the method further comprises:

the trunking terminal receiving channel resource information of the TGTCH through the TGCCH, demodulating the TGCCH by adopting a trunking radio network temporary identity (T-RNTI) received in advance, obtaining the channel resource information of the TGTCH, monitoring the TGTCH, and receiving trunking data of a calling terminal sent by a PDS on the TGTCH.

An evolved node B comprises a receiving unit, wherein, the receiving unit is configured to: in a trunking common control channel (TCCCH) in an uplink direction, receive a call request message sent by a calling terminal, wherein, the TCCCH is used for bearing an uplink message of a trunking terminal.

Alternatively, the evolved node B further comprises: a judgment unit, wherein:

the judgment unit is configured to: after the receiving unit receives the call request message, judge whether the call request message is a trunking call request message according to reserved bits in a media access control (MAC) header of a data packet encapsulating the call request message; and if yes, then trigger the call to a scheduling platform (PDS).

An evolved node B comprises a paging unit, wherein:

the paging unit is configured to: issue a trunking paging message to a listening terminal in a trunking group of a calling terminal on a trunking paging control channel (TPCCH) on a downlink direction, wherein, the TPCCH is used for bearing the trunking paging message.

Alternatively, a reserved bit in a media access control (MAC) header of a data packet encapsulated by a message born by the TPCCH indicates that the message is a trunking service message.

An evolved node B comprises a first channel establishment unit, wherein:

the first channel establishment unit is configured to: establish a trunking group traffic channel (TGTCH) and a trunking group control channel TGCCH on a downlink direction in a cell to which the paged listening terminal belongs, wherein, the TGTCH is used for bearing downlink service data of the trunking service, and the TGCCH is used for bearing a downlink control message of the trunking service.

Alternatively, a reserved bit in a media access control (MAC) header of a data packet encapsulated by a message born by the TGTCH and the TGCCH indicates that the message is a trunking service message.

Alternatively, the evolved node B further comprises a channel resource information sending unit, wherein:

the channel resource information sending unit is configured to: send channel resource information of the TGTCH to the listening terminal through the TGCCH, and trigger the listening terminal to monitor the TGTCH channel.

An evolved node B comprises a second channel establishment unit, wherein:

the second channel establishment unit is configured to establish an uplink and downlink dedicated service channel and an uplink and downlink dedicated control channel with a calling terminal, wherein, the uplink and downlink dedicated service channel bears uplink and downlink service data on the calling terminal, and the uplink and downlink dedicated control channel bears a control message between the calling terminal and the evolved node B.

Alternatively, a reserved bit in a media access control (MAC) header of a data packet encapsulated by a message born by the uplink and downlink dedicated service channel and the uplink and downlink dedicated control channel indicates that the message is a trunking service message.

A terminal comprises a call request unit, wherein:

the call request unit is configured to: send a call request message to an evolved node B on a trunking common control channel (TCCCH) at an uplink direction, wherein, the TCCCH is used for bearing an uplink message of a trunking terminal.

Alternatively, the call request unit is configured to: send a call request message to an evolved node B on a trunking common control channel (TCCCH) at an uplink direction by the following mode: when encapsulating the call request message, setting reserved bits in a media access control (MAC) header of a data packet encapsulating the call request message to indicate the call request message as a trunking call request message.

Alternatively, the terminal further comprises a trunking data sending unit, wherein:

the trunking data sending unit is configured to: send trunking data to a scheduling platform (PDS) through establishing an uplink and downlink dedicated service channel with the evolved node B, wherein, the uplink and downlink dedicated service channel bears uplink and downlink service data on the calling terminal.

A terminal comprises a paging response unit and a channel establishment unit, wherein:

the paging response unit is configured to: receive a trunking paging message sent by an evolved node B, and send a paging response message to the evolved node B; and the channel establishment unit is configured to: establish a trunking group traffic channel (TGTCH) and a trunking group control channel (TGCCH) on a downlink direction with the evolved node B, wherein, the TGTCH is used for bearing downlink service data of the trunking service, and the TGCCH is used for bearing a downlink control message of the trunking service.

Alternatively, the terminal further comprises a demodulation unit and a monitoring unit, wherein:

the demodulation unit is configured to: receive channel resource information of the TGTCH through the TGCCH, demodulate the TGCCH by adopting a trunking radio network temporary identity (T-RNTI) received in advance, and obtain the channel resource information of the TGTCH; and the monitoring unit is configured to: monitor the TGTCH, and receive trunking data of a calling terminal sent by a PDS on the TGTCH.

In sum, the embodiment of the present document implements a trunking function in a manner of newly adding a trunking service dedicated logic channel in an uplink/downlink direction and on the basis of an LTE system standard protocol, and supports concurrence of an LTE service and a trunking service in a same system. The demands of the trunking communications may be implemented on the basis of the LTE system, and the coexistence of the trunking service and the LTE service in a same system is implemented.

PREFERRED EMBODIMENTS OF THE PRESENT DOCUMENT

Figure 1:
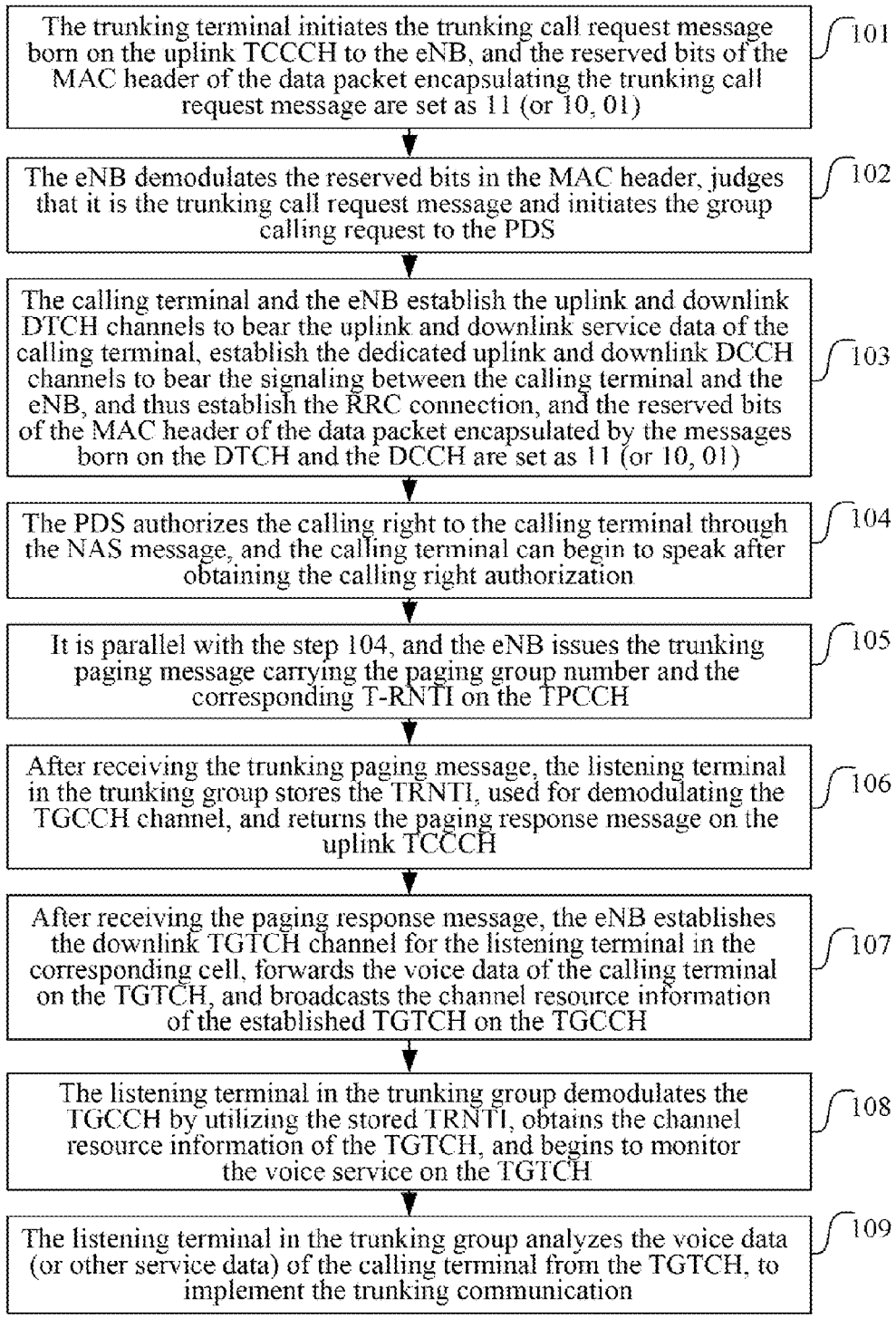
FIG. 1 is a flow chart of a method for implementing a trunking service according to an embodiment of the present document.

The embodiment of the present document implements the trunking service on the basis of the LTE, and there are some methods for implementing the trunking service based on the LTE as well at present; however, these methods have not fully considered the design when the LTE service and the trunking service coexist, and the logic channels of the trunking services are distinguished by adopting different identifications, which takes up too many logic channel resources in the LTE protocol, and the trunking service will be influenced while expanding in the subsequent LTE protocol. The embodiment of the present document fully considers the above-mentioned factors, proposes to distinguish the logic channels of the trunking services by the reserved bit in the MAC header, to reduce the occupation of the LTE resources.

All the dedicated channels in the LTE existing protocol are point-to-point communication modes, which is unable to meet the requirement of the trunking service. In order to implement the trunking service in the LTE system, the trunking dedicated channel needs to be added in the LTE system. The following channels are added in the present execution mode.

A trunking paging control channel (TPCCH), a trunking group traffic channel (TGTCH) and a trunking group control channel (TGCCH) are added in the downlink direction, for bearing a downlink control message and downlink service data of the trunking terminal.

A trunking common control channel (TCCCH) is added in the uplink direction, for bearing an uplink message of the trunking terminal.

The trunking relevant signaling and data in the present execution mode are born on different logic channels to implement the trunking service in the LTE system, and it is guaranteed that the original LTE service also proceeds normally at the same time. The embodiment of the present document fully considers the implementation of the service in the scene that the LTE service and the trunking service coexist, and has broad application prospect of market.

The above-mentioned trunking dedicated channels newly-added in the LTE are explained respectively hereinafter.

In the downlink direction:

the trunking group traffic channel (TGTCH) is a point-to-multipoint mode, and is used for bearing the downlink service data of the trunking service.

The trunking group control channel (TGCCH) is a point-to-multipoint mode, and is used for bearing the downlink control message of the trunking service, including the control messages, such as, group calling establishing and releasing, calling right notification, neighboring cell resource information, downlink non-access stratum (NAS) between a scheduling platform (PDS) and a terminal, etc.

The TGTCH and the TGCCH are both mapped on the downlink shared channel (DL-SCH), and are scrambled by the trunking radio network temporary identity (T-RNTI, there is the only T-RNTI in each group under one eNB) corresponding to the group, to implement the functions of the downlink data broadcasting and the simultaneous demodulation of multiple terminals in the group.

In order to be distinguished with the LTE dedicated channel, two reserved bits of the MAC header of the data packet encapsulating the message are set as 11 (or 01 or 10) when the messages are packed as to the service born by the newly-added TGTCH and TGCCH, while the reserved bits of the MAC header are set as 00 when the services born on the LTE dedicated channel are packed, and the logical channel identification (LCID) still uses the range (00001~01010) predetermined by the LTE protocol.

The trunking paging control channel (TPCCH) is the point-to-multipoint mode and used for bearing the trunking paging message, carrying the T-RNTI of the group. The TPCCH is mapped to the trunking paging channel (TPCH), and is scrambled by the TP-RNTI.

In uplink direction:

The trunking common control channel (TCCCH) is a point-to-point mode, and used for bearing the uplink message of the trunking terminal, including: calling right application, a terminal reporting CQI information to the eNB, a terminal sending a trunking signaling to the PDS and terminal status information, etc., which is mapped on the uplink shared channel (UL-SCH) and reported to the eNB. The reserved bits in the MAC header of the data encapsulated by the message on the TCCCH are set as 11 (or 01 or 10), to distinguish with the LTE data.

As to the saying user (the user speaking) in the trunking service, the original dedicated channel (DCCH) of the LTE system is multiplexed in the uplink and downlink directions respectively to bear the dedicated signaling, the original dedicated service channel (DTCH) is multiplexed to bear the dedicated data, and the differentiation of the LTE service and the trunking service is implemented by the reserved bits in the MAC header. When the DTCH is used for the trunking service based on the LTE, the reserved bits of the MAC PDU Header are set as 11 (or 10 or 01); otherwise set as 00. The LCID range still uses the range (00001~01010) stipulated by the LTE protocol.

When the saying user performs the LTE service and the trunking service at the same time, the eNB can judge whether to be the LTE service data or the trunking service data currently according to the reserved bits in the MAC header.

The method for implementing the trunking service of the present execution mode includes the following steps.

In step one: the trunking terminal initiates a call request message to the eNB; if it is a trunking call request message, then the uplink message is born on the TCCCH, and the reserved bits in the MAC header of the data packet encapsulated by the message are set as 11 (or 01, 10).

If it is an LTE call, then the uplink message is born on the CCCH, and the reserved bits in the MAC header of the data packet encapsulated by the message are set as 00.

The eNB judges whether the call request message is the trunking call request message according to the reserved bits in the demodulated MAC header; if it is the trunking call request message, a request for establishing the group calling is sent to the PDS; otherwise, it is the LTE access, a connection establishment request is sent to the MME. It is explained regarding the trunking group call as the example hereinafter.

In step two: the PDS authorizes the calling terminal, and the calling terminal and the eNB establish the uplink and downlink DTCH channels to bear the uplink and downlink service data of the calling terminal and establish the dedicated uplink and downlink DCCH channels to bear the control message between the calling terminal and the eNB.

In step three: the eNB pages the trunking terminal in the listening state through the TPCCH, the listening terminal returns a paging response message on the TCCCH channel, and the eNB establishes the TGCCH and the TGTCH in the cell with the paging response message and broadcasts the channel resource information of the established TGTCH to the listening terminal through the TGCCH.

In step four: the listening terminal demodulates the TGCCH by utilizing the T-RNTI carried in the TPCCH, obtains the channel carried resource information of the TGTCH, and monitors the TGTCH channel.

In step five: the trunking data (voice data) of the calling terminal are uploaded to the PDS through the dedicated DTCH, the PDS forwards the voice data (or other service data, generally the trunking data) of the calling terminal in the cell of the TGTCH channel through the TGTCH, and the listening user in the trunking group analyzes the voice (or other service data) on the TGTCH, thus realizing the trunking communication requirement.

The specific implementation of the present document is further illustrated in detail by combining the accompanying figures and the specific execution modes hereinafter.

The present execution mode, in order to implement the trunking service in the LTE system, adds several trunking service dedicated uplink and downlink logic channels.

In the downlink direction: the trunking group traffic channel (TGTCH) is introduced, which is a point-to-multipoint mode and used for bearing the trunking service data. The trunking group control channel (TGCCH) is introduced, which is the point-to-multipoint mode and used for bearing the control message of the trunking terminal, including the control information, such as, group calling establishing and releasing, calling right notification, neighboring cell resource information, downlink non-access stratum (NAS) between a scheduling platform (PDS) and a terminal, etc. The trunking paging control channel (TPCCH) is introduced, which is the point-to-multipoint mode and used for bearing the trunking paging message, carrying the T-RNTI of the group.

In the uplink direction, the trunking common control channel (TCCCH) is introduced, which is a point-to-point mode and used for bearing the calling right application, the terminal reporting CQI information to the eNB, the terminal sending a trunking signaling to the PDS and terminal status information, etc.

In the single calling scene and the group calling scene, as to the saying user, the original DCCH channel of the LTE system is multiplexed in the uplink and downlink directions respectively to bear the dedicated signaling, the original DTCH is multiplexed to bear the dedicated data, and the differentiation of the LTE service and the trunking service is implemented by the reserved bits in the MAC PDU header. When the DTCH is used for the trunking service, the reserved bits of the MAC PDU Header are set as 11 (or 10 or 01), otherwise as 00. When the saying user performs the LTE service and the trunking service at the same time, the eNB can judge whether to be the LTE service data or the trunking service data currently according to the reserved bits in the MAC header.

The method for implementing a trunking service of the present text is further explained through the following specific execution mode, and the specific execution mode is described in detail by taking establishing the trunking service as the example hereinafter, but is not regarded as the limitation of the present document.

As shown in FIG. 1, the method for implementing the trunking service in the present execution mode includes the following steps.

In step 101: the trunking terminal initiates the trunking call request message born on the uplink TCCCH to the eNB, and the reserved bits of the MAC header of the data packet encapsulating the trunking call request message are set as 11 (or 10, 01).

In step 102: the eNB demodulates the reserved bits in the MAC header, judges that is is the trunking call request message and initiates the group calling request to the PDS.

In step 103: the calling terminal and the eNB establish the uplink and downlink DTCH channels to bear the uplink and downlink service data of the calling terminal, establish the dedicated uplink and downlink DCCH channels to bear the signaling between the calling terminal and the eNB, and thus establish the RRC connection, and the reserved bits of the MAC header of the data packet encapsulated by the messages born on the DTCH and the DCCH are set as 11 (or 10, 01).

In step 104: the PDS authorizes the calling right to the calling terminal through the NAS message, and the calling terminal can begin to speak after obtaining the calling right authorization.

In step 105: it is parallel with the step 104, and the eNB issues the trunking paging message carrying the paging group number and the corresponding T-RNTI on the TPCCH.

In step 106: after receiving the trunking paging message, the listening terminal in the trunking group stores the T-RNTI, used for demodulating the TGCCH channel, and returns the paging response message on the uplink TCCCH.

In step 107: after receiving the paging response message, the eNB establishes the downlink TGTCH channel for the listening terminal in the corresponding cell, forwards the voice data of the calling terminal on the TGTCH, and broadcasts the channel resource information of the established TGTCH on the TGCCH.

In step 108: the listening terminal in the trunking group demodulates the TGCCH by utilizing the stored T-RNTI, obtains the channel resource information of the TGTCH, and begins to monitor the voice service on the TGTCH.

In step 109: the listening terminal in the trunking group analyzes the voice data (or other service data) of the calling terminal from the TGTCH, to implement the trunking communication.

Figure 2:
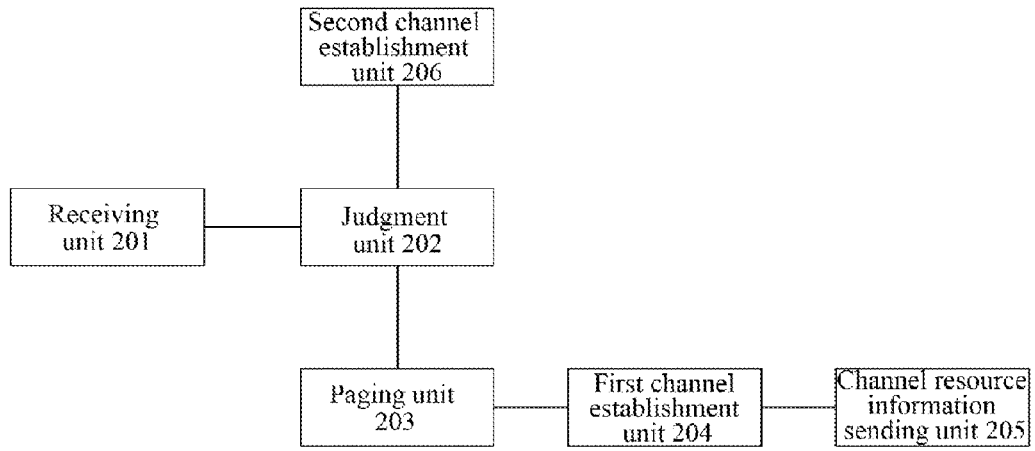
FIG. 2 is a framework diagram of an evolved node B according to an embodiment of the present document.

As shown in FIG. 2, the present execution mode further provides an evolved node B, including a receiving unit 201, wherein, the receiving unit 201 is configured to: receive a call request message sent by a calling terminal in a trunking common control channel (TCCCH) in an uplink direction, wherein, the TCCCH is used for bearing an uplink message of a trunking terminal.

The evolved node B further includes a judgment unit 202, wherein:

the judgment unit 202 is configured to: after the receiving unit 201 receives the call request message, judge whether the call request message is a trunking call request message according to reserved bits in a media access control (MAC) header of a data packet encapsulating the call request message; and if yes, then trigger the call to a scheduling platform (PDS).

Referring to FIG. 2, another evolved node B of the present execution mode includes a paging unit 203, wherein:

the paging unit 203 is configured to: issue a trunking paging message to a listening terminal in a trunking group of a calling terminal on a trunking paging control channel (TPCCH) on a downlink direction, wherein, the TPCCH is used for bearing the trunking paging message.

A reserved bit in a media access control (MAC) header of a data packet encapsulated by a message born by the TPCCH indicates that the message is a trunking service message.

Referring to FIG. 2, another evolved node B of the present execution mode includes a first channel establishment unit 204, wherein:

the first channel establishment unit 204 is configured to: establish a trunking group traffic channel (TGTCH) and a trunking group control channel TGCCH on a downlink direction in a cell to which the paged listening terminal belongs, wherein, the TGTCH is used for bearing downlink service data of the trunking service, and the TGCCH is used for bearing a downlink control message of the trunking service.

A reserved bit in a media access control (MAC) header of a data packet encapsulated by a message born by the TGTCH and the TGCCH indicates that the message is a trunking service message.

The evolved node B further includes a channel resource information sending unit 205, wherein:

the channel resource information sending unit 205 is configured to: send channel resource information of the TGTCH to the listening terminal through the TGCCH, and trigger the listening terminal to monitor the TGTCH channel.

Referring to FIG. 2, another evolved node B of the present execution mode includes a second channel establishment unit 206, wherein:

the second channel establishment unit 206 is configured to establish an uplink and downlink dedicated service channel and an uplink and downlink dedicated control channel with a calling terminal, wherein, the uplink and downlink dedicated service channel bears uplink and downlink service data on the calling terminal, and the uplink and downlink dedicated control channel bears a control message between the calling terminal and the evolved node B.

A reserved bit in a media access control (MAC) header of a data packet encapsulated by a message born by the uplink and downlink dedicated service channel and the uplink and downlink dedicated control channel indicates that the message is a trunking service message.

Figure 3:
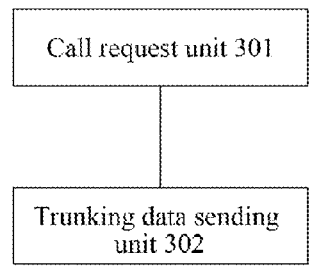
FIG. 3 is a framework diagram of a terminal according to an embodiment of the present document.

As shown in FIG. 3, the present execution mode further provides a terminal, including a call request unit 301, wherein:

the call request unit 301 is configured to: send a call request message to an evolved node B on a trunking common control channel (TCCCH) in an uplink direction, wherein, the TCCCH is used for bearing an uplink message of a trunking terminal.

The call request unit 301 is configured to: send a call request message to an evolved node B on a trunking common control channel (TCCCH) in an uplink direction by the following mode: when encapsulating the call request message, setting reserved bits in a media access control (MAC) header of a data packet encapsulating the call request message to indicate the call request message as a trunking call request message.

The terminal further includes a trunking data sending unit 302, wherein:

the trunking data sending unit 302 is configured to: send trunking data to a scheduling platform (PDS) through establishing an uplink and downlink dedicated service channel with the evolved node B, wherein, the uplink and downlink dedicated service channel bears uplink and downlink service data on the calling terminal.

Figure 4:
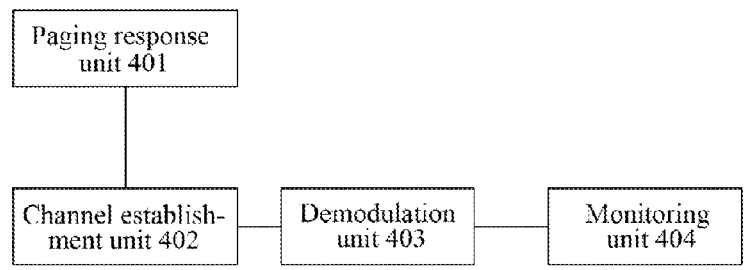
FIG. 4 is a framework diagram of another terminal according to an embodiment of the present document.

As shown in FIG. 4, another terminal of the present execution mode includes a paging response unit 401 and a channel establishment unit 402, wherein:

the paging response unit 401 is configured to: receive a trunking paging message sent by an evolved node B, and send a paging response message to the evolved node B; and the channel establishment unit 402 is configured to: establish a trunking group traffic channel (TGTCH) and a trunking group control channel (TGCCH) on a downlink direction with the evolved node B, wherein, the TGTCH is used for bearing downlink service data of the trunking service, and the TGCCH is used for bearing a downlink control message of the trunking service.

The terminal further includes a demodulation unit 403 and a monitoring unit 404, wherein:

the demodulation unit 403 is configured to: receive channel resource information of the TGTCH through the TGCCH, demodulate the TGCCH by adopting a trunking radio network temporary identity (T-RNTI) received in advance, and obtain the channel resource information of the TGTCH; and the monitoring unit 404 is configured to: monitor the TGTCH, and receive trunking data of a calling terminal sent by a PDS on the TGTCH.

Obviously, the above description is only one specific execution method of the present document and the present document is not only limited in the above-mentioned specific method. Those skilled in the art can make the corresponding modifications and variations according to the present document without departing from the spirit and essence of the present document. And all of these modifications or the variations should be embodied in the scope of the appending claims of the present document.

INDUSTRIAL APPLICABILITY

The embodiment of the present document implements a trunking function in a manner of newly adding a trunking service dedicated logic channel in an uplink/downlink direction and on the basis of an LTE system standard protocol, and supports concurrence of an LTE service and a trunking service in a same system. The demands of the trunking communications may be implemented on the basis of the LTE system, and the coexistence of the trunking service and the LTE service in a same system is implemented. Therefore, the present document has a very strong industrial applicability.

What we claim is:

1. A method for implementing a trunking service, applied to a long term evolution system, comprising:
    an evolved node B receiving a call request message sent by a calling terminal in a common control channel in an uplink direction, wherein, the common control channel is used for bearing an uplink message of a trunking terminal; and the evolved node B broadcasting data to a listening terminal in a downlink direction; wherein the method further comprises:

the evolved node B, after receiving the call request message, judging whether the call request message is a trunking call request message according to reserved bits in a media access control (MAC) header of a data packet encapsulating the call request message; and if yes, then triggering the call to a scheduling platform (PDS).

2. A method for implementing a trunking service, applied to a long term evolution system, comprising:

an evolved node B, after receiving a trunking call request message, issuing a trunking paging message to a listening terminal in a trunking group of a calling terminal on a paging control channel in a downlink direction, wherein, the paging control channel is used for bearing the trunking paging message; and the evolved node B broadcasting data to the listening terminal in the downlink direction;

wherein a reserved bit in a media access control (MAC) header of a data packet encapsulated by a message born by the paging control channel indicates that the message is a trunking service message.

3. A method for implementing a trunking service, applied to a long term evolution system, comprising:

an evolved node B paging a listening terminal, and establishing a traffic channel and a control channel in a downlink direction in a cell to which the paged listening terminal belongs, wherein, the traffic channel is used for bearing downlink service data of the trunking service, and the control channel is used for bearing a downlink control message of the trunking service; and the evolved node B broadcasting data to the listening terminal in the downlink direction;

wherein a reserved bit in a media access control (MAC) header of a data packet encapsulated by a message born by the traffic channel and the control channel indicates that the message is a trunking service message.

4. An evolved node B, comprising a receiving unit and a broadcasting unit, wherein, the receiving unit is configured to: receive a call request message sent by a calling terminal in a common control channel in an uplink direction, wherein, the common control channel is used for bearing an uplink message of a trunking terminal; and the broadcasting unit is configured to broadcast data to a listening terminal in a downlink direction; wherein the evolved node B further comprising a judgment unit configured to: after the receiving unit receives the call request message, judge whether the call request message is a trunking call request message according to reserved bits in a media access control (MAC) header of a data packet encapsulating the call request message; and if yes, then trigger the call to a scheduling platform (PDS).

5. The evolved node B according to claim 4, further comprising a paging unit, wherein:

the paging unit is configured to: issue a trunking paging message to a listening terminal in a trunking group of a calling terminal on a paging control channel in a downlink direction, wherein, the paging control channel is used for bearing the trunking paging message.

6. The evolved node B according to claim 5, wherein, a reserved bit in a media access control (MAC) header of a data packet encapsulated by a message born by the paging control channel indicates that the message is a trunking service message.

7. An evolved node B, comprising a first channel establishment unit and a broadcasting unit, wherein:

the first channel establishment unit is configured to: establish a traffic channel and a control channel in a downlink direction in a cell to which the paged listening terminal belongs, wherein, the traffic channel is used for bearing downlink service data of the trunking service, and the control channel is used for bearing a downlink control message of the trunking service; and the broadcasting unit is configured to broadcast data to the listening terminal in the downlink direction;

wherein a reserved bit in a media access control (MAC) header of a data packet encapsulated by a message born by the traffic channel and the control channel indicates that the message is a trunking service message.

8. The evolved node B according to claim 7, further comprising a channel resource information sending unit, wherein:

the channel resource information sending unit is configured to: send channel resource information of the traffic channel to the listening terminal through the control channel, and trigger the listening terminal to monitor the traffic channel.

9. A terminal, comprising a call request unit and a receiving unit, wherein:

the call request unit is configured to: send a call request message to an evolved node B on a common control channel at an uplink direction by the following mode: when encapsulating the call request message, setting reserved bits in a media access control (MAC) header of a data packet encapsulating the call request message to indicate the call request message as a trunking call request message, wherein, the common control channel is used for bearing an uplink message of a trunking terminal; and the receiving unit is configured to receive data broadcasted by the evolved node B in a downlink direction.

10. The terminal according to claim 9, further comprising a trunking data sending unit, wherein:

the trunking data sending unit is configured to: send trunking data to a scheduling platform (PDS) through an established uplink and downlink dedicated service channel with the evolved node B, wherein, the uplink and downlink dedicated service channel bears uplink and downlink service data of the calling terminal.

11. The terminal according to claim 9, further comprising a paging response unit and a channel establishment unit, wherein:

the paging response unit is configured to: receive a trunking paging message sent by an evolved node B, and send a paging response message to the evolved node B; and the channel establishment unit is configured to: establish a traffic channel and a control channel in a downlink direction with the evolved node B, wherein, the traffic channel is used for bearing downlink service data of the trunking service, and the control channel is used for bearing a downlink control message of the trunking service.

12. The terminal according to claim 11, further comprising a demodulation unit and a monitoring unit, wherein:

the demodulation unit is configured to: receive channel resource information of the traffic channel through the control channel, demodulate the control channel by adopting a trunking radio network temporary identity (T-RNTI) received in advance, and obtain the channel resource information of the traffic channel; and the monitoring unit is configured to: monitor the traffic channel, and receive trunking data of a calling terminal sent by a PDS on the traffic channel.

13. The method according to claim 1, further comprising: the trunking terminal sending trunking data to a scheduling platform (PDS) through an established uplink and downlink dedicated service channel with the evolved node B, wherein, the uplink and downlink dedicated service channel bears uplink and downlink service data of the calling terminal.

14. The method according to claim 2,
further comprising: when the evolved node B issues the trunking paging message to the listening terminal in the trunking group of the calling terminal on the paging control channel, carrying a trunking radio network temporary identity (T-RNTI) in the trunking paging message;

or, the method further comprising: the evolved node B receiving a paging response message of the listening terminal on the common control channel, and judging to page to a corresponding listening terminal after receiving the paging response message, wherein, the common control channel is used for bearing an uplink message of the trunking terminal.

15. The method according to claim 2, further comprising:
a trunking terminal establishing a traffic channel and a control channel in a downlink direction with an evolved node B after receiving a trunking paging message sent by the evolved node B, wherein, the traffic channel is used for bearing downlink service data of the trunking service, and the control channel is used for bearing a downlink control message of the trunking service;

the method further comprising: the trunking terminal receiving channel resource information of the traffic channel through the control channel, demodulating the control channel by adopting a trunking radio network temporary identity (T-RNTI) received in advance, obtaining the channel resource information of the traffic channel, monitoring the traffic channel, and receiving trunking data of a calling terminal sent by a PDS on the traffic channel.

16. The method according to claim 3, wherein, a reserved bit in a media access control (MAC) header of a data packet encapsulated by a message born by the traffic channel and the control channel indicates that the message is a trunking service message;

or the method further comprising: after the evolved node B establishes the traffic channel and the control channel, the evolved node B sending channel resource information of the traffic channel to the listening terminal through the control channel, and triggering the listening terminal to monitor the traffic channel.

* * * * *